Jan. 31, 1950 G. L. FERNSLER 2,496,044

FREQUENCY MODULATED OSCILLATOR

Filed Aug. 24, 1946

By

Inventor
George L. Fernsler
C. D. Tuska
Attorney

Patented Jan. 31, 1950

2,496,044

UNITED STATES PATENT OFFICE 2,496,044

FREQUENCY-MODULATED OSCILLATOR

George L. Fernsler, Lawrenceville, N. J., assignor to Radio Corporation of America, a corporation of Delaware Application August 24, 1946, Serial No. 692,888

10 Claims. (Cl. 250—36)

This invention relates to frequency-modulated oscillators such as used in radar and other ultra high-frequency systems, and particularly to methods and systems for maintaining the power output of such oscillators substantially constant throughout their modulation range.

It is typical of frequency-modulated oscillators in general, and particularly those using tubes of the resonant cavity type, that the power output varies over the range of frequency modulation; otherwise and more specifically stated, the frequency modulation of magnetrons, Klystrons and other velocity-modulated tubes, is inherently accompanied by substantial amplitude modulation. It is the principal purpose of the invention materially to reduce or minimize this undesired amplitude modulation.

In accordance with the present invention, there are produced electrical impulses which vary with the modulation frequency and which are applied to the oscillator in such timed relation to the modulation frequency that their amplitude modulation effect substantially neutralizes the amplitude modulation incident to the frequency modulation. More specifically, there are derived from the frequency modulation, electrical impulses which have the same repetition rate as the frequency modulation and whose waveform, modified by reshaping if necessary, at least approximates the power-output/frequency characteristic of the oscillator over its frequency-modulation range, and these impulses are utilized to vary the power input to the oscillator substantially in accordance with the inverse of its said power-output/frequency characteristic.

The invention further resides in methods and systems having features of novelty herein disclosed.

For a more detailed understanding of the invention, reference is made to the accompanying drawings, in which.

Figures 1, 2:
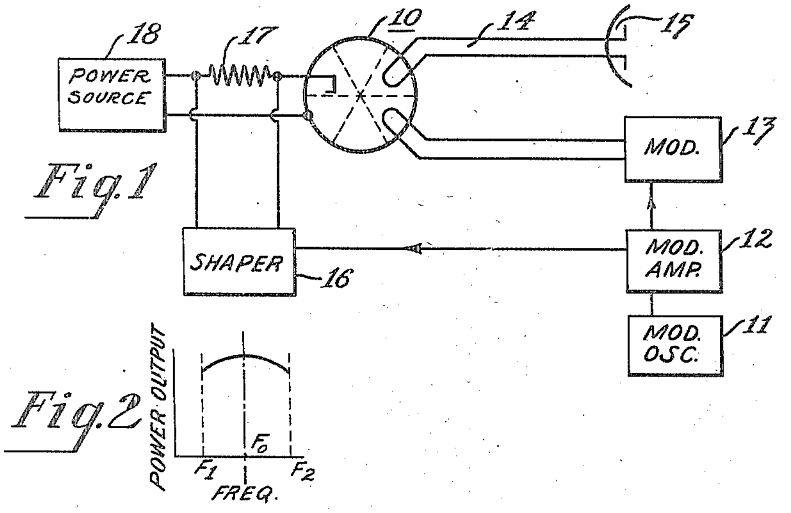
Figure 1 is a block diagram of one form of frequency-modulated radar transmitter embodying the invention.
Figure 2 is the power-output/frequency characteristic of a magnetron.
Figure 3:
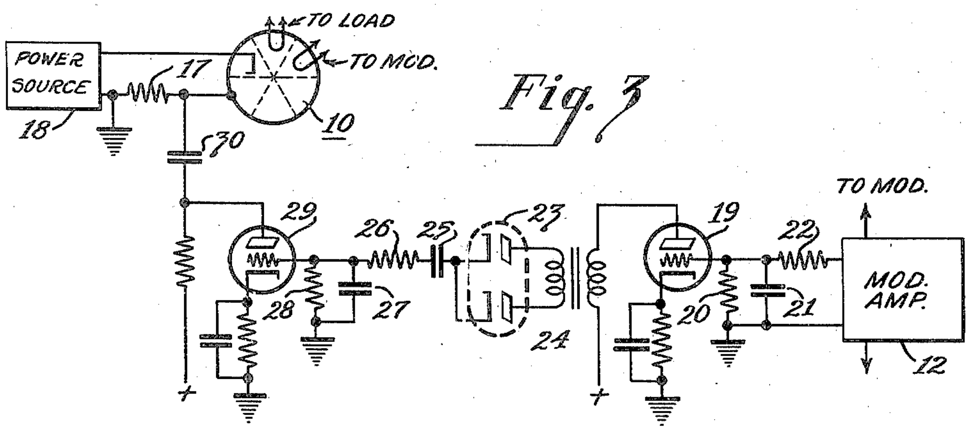

Figure 3 includes the schematic circuit diagram of a shaping network suited for inclusion in the system of Figure 1.

Figure 4:
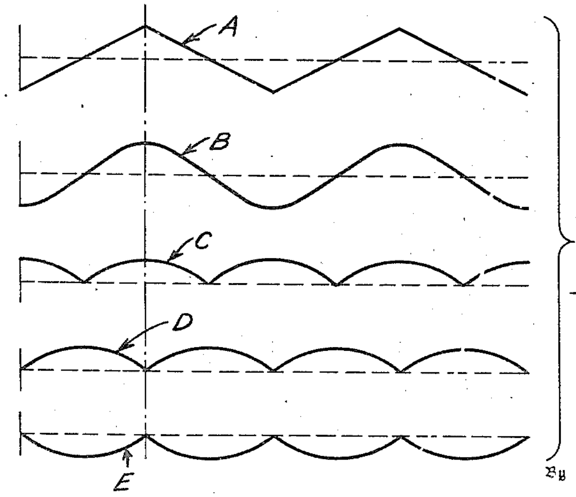

Figure 4 is an explanatory figure referred to in discussion of the operation of the shaping network of Figure 3.

Referring to Figure 1, the tube 10 is generically representative of a magnetron, Klystron, or other type of velocity-modulated tube having resonant cavity structure incorporated therein or associated therewith, but for simplicity in further explanation it will hereinafter be referred to as a magnetron.

For variation of the frequency of the magnetron over a range including the resonant frequency of its cavity structure, there may be employed any of the known methods or arrangements; for example, the effective load impedance may be varied electrically or mechanically with resultant shift in the frequency of oscillations produced by the magnetron; or, as in the particular arrangement shown and later specifically discussed, a voltage or current introduced into the resonant cavity may be varied at a desired modulation frequency.

Specifically, and in the particular arrangement described in which the oscillator 10 is that of a frequency-modulated radar transmitter coupled by transmission line 14 to an antenna system 15, there is used a sweep generator or modulator-oscillator 11 whose output is of saw-tooth wave form, such as shown in curve A of Figure 4, and whose frequency or repetition rate is materially lower than the frequency of oscillations generated by tube 10. For example, the frequency of the generator 11 may be of the order of 120 cycles per second, whereas the mean frequency of oscillator 10 may be of the order of 1500 megacycles.

The output of the sweep-oscillator 11 is amplified by a suitable amplifier 12 and applied to a modulator 13 of any suitable mechanical or electrical type for periodically causing the oscillator output frequency to vary between desired high and low limits. Specifically, and by way of example, the oscillator frequency may vary from 1495 megacycles to 1505 megacycles at the repetition rate of 120 cycles per second.

The frequency modulation of oscillators, particularly magnetrons and other velocity-modulated tubes, whether effected in the manner described or in any other way, is inherently accompanied by amplitude modulation. Referring to Figure 2 by way of example, the power output of a particular magnetron having the characteristic there shown does not remain constant as its frequency is varied from the mean frequency F0 within the range of frequencies F1 to F2 but is substantially lower at the end frequencies of the range of frequency modulation. Other magnetrons, of the same type, or even the same tube under different loadings, may have quite different power-output/frequency characteristics. This example, and the problem it presents, has been taken for purpose of explanation of the general solution to be applied in avoidance of the undesired amplitude modulation of any frequency-modulated oscillator of type here involved.

In general, it having been determined what is the power-output/frequency characteristic of a magnetron under particular frequency-modulation range and load conditions, there are produced electrical impulses which are of such wave form and are applied to the oscillator in such timed relation with respect to the frequency modulating impulses that they compensate for the tendency of the power output to vary with output frequency. Specifically, for a tube having the power-output/frequency characteristic shown in Figure 2, there should be applied to the oscillator compensating impulses having the shape shown by curves, C, D, or E of Figure 4, and having with respect to the modulation frequency the time relation evident from a comparison of curves A and E.

Most conveniently, these compensating impulses are derived from the modulating frequency itself rather than produced by an independent source, thus to avoid problems of synchronization. As generally shown in Figure 1, part of the output of the sweep generator 11, preferably after amplification, is applied periodically to vary the anode current of the oscillator tube. Except in rare cases, the wave-form of the modulating frequency will not correspond with the shape of the power-output/frequency characteristic of the magnetron. It is therefore usually necessary to interpose a shaping network, generically represented by block 16, in circuit between the output system of the frequency modulator 11 and the power source 18 which supplies the anode current of the tube. As will be understood by those skilled in the art, the particular circuits and constants used in the shaper 16 will depend upon the modification of wave form necessary to reshape the output wave-form of the modulator 11 in substantial correspondence with the power-output/frequency characteristic of the oscillator. In general, and as will appear in discussion of Figure 3, the reshaping network will include amplifiers, rectifiers, integrating circuits, inverter circuits; all familiar to those skilled in pulse-forming techniques.

Referring to the particular example under discussion, in which the modulating frequency is of saw-tooth wave-form, part of the output of the modulator amplifier 12 is impressed upon the input circuit of an amplifier tube 19, which circuit includes an integrating network comprising resistance 20 and condenser 21 fed from the amplifier through a resistor 22 of such high magnitude that network 20, 21 may be considered as current-fed. This network converts the shape of the impulses from a saw-tooth wave, such as curve A of Figure 4, to a sine wave, curve B of Figure 4. Of course, if the wave form of the modulating frequency as generated by oscillator 11 is of sine-wave form, network 20, 21 may be replaced by a coupling arrangement which transfers the impulses without modification of their shape.

The output of the tube 19 is impressed upon a full wave rectifier 23 as through transformer 24 so that the wave form of the output of the rectifier corresponds with curve C of Figure 4. The rectifier output is impressed, through a phase-shifting network comprising the series combination of capacitor 25, resistor 26, and the shunt combination of condenser 27 and resistor 28, upon the input circuit of amplifier tube 29 which inverts the impulses (curve D, Figure 4) so that its output has the wave-form exemplified by curve E of Figure 4. It should be noted that the shape of each of the impulses E is substantially the inverse of the power-output/frequency characteristic, Figure 2.

These impulses are applied to modulate the current supplied by source 18 to the oscillator 10; to produce amplitude-modulation which is substantially 180° out of phase with respect to the amplitude modulation inherently resulting from the frequency-modulation in the particular arrangement shown, the output circuit of the tube 29 is coupled by capacitor 30 and resistor 17 to the cathode-anode circuit of the magnetron 10. From a comparison of Figure 2 and curves A and E of Figure 4, it will be appreciated that during each cycle of the modulating frequency the power input to the tube is continuously varied in accordance with the inverse of its power-output/frequency characteristic, thus to maintain the power output substantially constant at all times. The application of the compensating amplitude modulation has a slight effect upon the magnetron frequency but this is inconsequential compared to the advantages obtained by maintaining constancy of the power output.

It is to be understood the invention is not limited to the particular circuit shown and described for purposes of illustration, but is coextensive in scope with the appended claims.

I claim as my invention:

1. The method of maintaining the output of a frequency-modulated oscillator substantially constant throughout its frequency-modulation range which comprises the steps of deriving electrical impulses from the modulating frequency, shaping said impulses substantially to correspond with the shape of the power-output/frequency characteristic of the oscillator, and applying the shaped impulses to a supply source for the oscillator in timed relation to the frequency modulation to compensate for tendency of the output of the oscillator to vary with the modulation.

2. The method of minimizing amplitude modulation inherent in frequency modulation of a continuously oscillating magnetron which comprises the steps of deriving electrical impulses from the modulating frequency, shaping said impulses substantially to correspond with the output/frequency characteristic of the magnetron, and applying the shaped impulses to the magnetron in such timed relation to the modulating frequency that the tendency for the output to vary with frequency is compensated.

3. A system comprising a high-frequency oscillator, modulating means for varying the frequency of said oscillator back and forth over a range of frequencies for which the power-output/frequency characteristic does not correspond with the wave-form of the modulating frequency, means coupled to said modulating means to derive therefrom a pair of electrical impulses for each cycle of the modulating frequency and of shape at least approximately corresponding with that of said power-output/frequency characteristic, and means for applying said impulses to said oscillator with like polarity to minimize amplitude modulation arising from its frequency modulation by said modulating means.

4. A system comprising a high-frequency oscillator, modulating means for periodically varying the frequency of said oscillator over a range of frequencies, means coupled to said modulating means to derive therefrom electrical impulses whose wave-form corresponds with that of the modulating frequency for the oscillator, shaping-network means for shaping the wave-form of said impulses substantially to correspond with the power-output/frequency characteristic of said oscillator, and means for applying the shaped impulses to the oscillator in time relation minimizing amplitude-modulation of the oscillator throughout said range of frequencies.

5. A system comprising a continuously oscillating magnetron, modulating means for varying the output frequency of said magnetron, a source of direct current for said magnetron, and a shaping network connected between said modulating means and said source for varying the current input to the magnetron to minimize variation of the power output thereof with variation of output frequency.

6. The method of operating a tube generator of continuous high-frequency oscillations which comprises varying the frequency of said oscillations over a range for which the power-output/frequency characteristic of the oscillator tube does not correspond with the wave-form of the modulating frequency, concurrently producing electrical impulses of the same repetition rate as said modulating frequency, shaping said impulses at least to approximate the shape of the power-output/frequency characteristic, and applying said shaped impulses to the oscillator with such polarity and in such timed relation with respect to the modulating frequency that the generator output is substantially constant throughout said range of frequencies.

7. The method of operating a tube generator of continuous high-frequency oscillations which comprises varying the frequency of said oscillations back and forth over a range for which the power-output/frequency characteristic of the oscillator tube does not correspond with the wave-form of the modulating frequency, in successive cycles of said modulating frequency producing pairs of electrical impulses of the same polarity, shaping said impulses at least to approximate the shape of said power-output/frequency characteristic, and applying said pairs of shaped impulses to the oscillator in such timed relation with respect to the modulating frequency that the oscillator output is maintained substantially constant throughout variation of its frequency from and back to each limit of said range.

8. The method of operating a tube generator of continuous high-frequency oscillations which comprises varying the frequency of said oscillations in accordance with a modulating frequency of chosen wave-form over a range of frequency for which the power-output/frequency characteristic of the oscillator tube does not correspond with said wave-form with said wave-form of the modulating-frequency, concurrently producing electrical impulses of the same repetition rate as said modulating frequency, shaping said impulses at least to approximate the shape of said power-output/frequency characteristic, and applying said shaped impulses to the oscillator to vary the power input thereto substantially in accordance with the inverse of said power-output/frequency characteristic and in such timed relation to said modulating frequency that the oscillator output is substantially constant throughout said range of frequencies.

9. A system comprising a high-frequency oscillator including an oscillator tube, modulating means producing a saw-tooth wave for periodically varying the frequency of said oscillator linearly back and forth over a range toward whose upper and lower limits the power-output of said oscillator decreases, an integrating network coupled to said modulating means to derive a sinusoidal wave of the same frequency as said saw-tooth wave, full-wave rectifier means for converting said sinusoidal wave to unidirectional half-sine pulses whose repetition rate is double the repetition rate of said saw-tooth wave, a delay-network for timing said pulses so that the zeros of successive pulses respectively coincide in time with the opposite limits of said range of the oscillator-frequency, and means for applying said pulses to said oscillator to increase the input thereto as its frequency approaches said upper and lower limits.

10. A system comprising a high-frequency oscillator including an oscillator tube, modulating means producing a sinusoidal wave for varying the frequency of said oscillator sinusoidally over a range toward whose upper and lower limits the power-output of said oscillator decreases, full-wave rectifier means coupled to said modulating means to convert said sinusoidal wave to unidirectional half-sine pulses, a delay-network for timing said pulses so that the zeros of successive pulses respectively coincide in time with the opposite limits of said oscillator frequency-range, and means for applying said pulses to said oscillator to increase the input thereto as its frequency approaches said upper and lower limits.

GEORGE L. FERNSLER.

REFERENCES CITED

The following references are of record in the file of this patent:

UNITED STATES PATENTS

| Number | Name | Date |
|---|---|---|
| 2,075,071 | Usselman | Mar. 30, 1937 |
| 2,135,199 | Ponte et al. | Nov. 1, 1938 |
| 2,211,404 | Braden | Aug. 13, 1940 |
| 2,310,260 | Schock | Feb. 9, 1943 |
| 2,434,704 | Kroger | Jan. 20, 1948 |